United States Patent
Yoda

(10) Patent No.: US 7,181,091 B2
(45) Date of Patent: Feb. 20, 2007

(54) METHOD, APPARATUS, AND RECORDING MEDIUM FOR CORRECTING APPRECIATION DATA

(75) Inventor: Akira Yoda, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 913 days.

(21) Appl. No.: 10/097,516

(22) Filed: Mar. 15, 2002

(65) Prior Publication Data

US 2002/0131652 A1   Sep. 19, 2002

(30) Foreign Application Priority Data

Mar. 16, 2001   (JP)   ............... 2001-076316

(51) Int. Cl.
   *G06K 9/03*   (2006.01)
(52) U.S. Cl. ............ 382/309; 348/251; 348/254; 358/461; 358/518; 382/167; 382/274
(58) Field of Classification Search ............ 358/1.9, 358/518, 448, 461; 382/167, 274, 309, 165; 348/251, 254
   See application file for complete search history.

(56) References Cited

U.S. PATENT DOCUMENTS

| | | | |
|---|---|---|---|
| 5,189,511 A * | 2/1993 | Parulski et al. ............ 358/518 |
| 5,739,924 A | 4/1998 | Sano | |
| 5,835,243 A * | 11/1998 | Mori ............ 358/518 |
| 6,160,634 A * | 12/2000 | Terashita ............ 358/1.9 |
| 6,188,486 B1 * | 2/2001 | Yamada ............ 358/1.15 |
| 6,577,826 B1 * | 6/2003 | Misaizu et al. ............ 399/45 |
| 6,608,926 B1 * | 8/2003 | Suwa et al. ............ 382/162 |
| 6,704,521 B2 * | 3/2004 | Isobe et al. ............ 399/12 |
| 6,724,507 B1 * | 4/2004 | Ikegami et al. ............ 358/518 |
| 6,728,428 B1 * | 4/2004 | Kinjo ............ 382/309 |
| 6,833,926 B1 * | 12/2004 | Takano et al. ............ 358/1.15 |
| 6,888,964 B2 * | 5/2005 | Schluter et al. ............ 382/167 |
| 6,952,223 B2 * | 10/2005 | Terashita ............ 348/222.1 |
| 7,079,702 B2 * | 7/2006 | Watanabe et al. ............ 382/274 |
| 2002/0131652 A1 * | 9/2002 | Yoda ............ 382/309 |

FOREIGN PATENT DOCUMENTS

| JP | 7-159904 | 6/1995 |
|---|---|---|
| JP | 9-181918 | 7/1997 |
| JP | 9-233423 | 9/1997 |

* cited by examiner

*Primary Examiner*—Gregory Desire
(74) *Attorney, Agent, or Firm*—Birch, Stewart, Kolasch & Birch, LLP

(57) ABSTRACT

Images having been subjected to image processing optimal for each user or each output device are obtained. Correction function calculation means calculates correction functions for correcting image data sets for each user ID or for each device ID, and correction function storing means stores the calculated correction functions. When the image processing is carried out on the image data sets, the correction functions corresponding to the user ID or the device ID added to the image data sets are searched for and correction parameter calculation means calculates correction parameters based on the correction functions. The image processing is then carried out on the image data sets according to the correction parameters to generate corrected image data sets.

30 Claims, 10 Drawing Sheets

METHOD, APPARATUS, AND RECORDING MEDIUM FOR CORRECTING APPRECIATION DATA

BACKGROUND OF THE INVENTION

1. Field of the Invention

The present invention relates to an appreciation data correction method and an appreciation data correction apparatus for carrying out aesthetic processing such as image processing on appreciation data such as image data and audio data. The present invention also relates to a computer-readable recording medium storing a program that causes a computer to execute the appreciation data correction method.

2. Description of the Related Art

There have been known systems for appreciation of images and music without constraints on time and place. In such a system, image data obtained by photographing a subject with a digital camera or a digital camcorder or audio data obtained by privately recording a music performance are stored in a server after the data are transferred to the server via a public communication line. The data are transferred to an apparatus for reproducing the data whenever needed. By using such a system, a person who privately recorded the data can appreciate the image data or the audio data either alone or with family members and friends thereof. The data can be reproduced in the system by the reproduction apparatus of various models, such as a reproduction apparatus that directly reproduces the data (a cellular phone, a digital TV set, a game terminal, an electronic photo frame, a personal digital assistant (PDA), an in-vehicle terminal, an outdoor large-screen display, a head mount display, and a retinal projection display), by a reproduction apparatus dedicated to reproducing the data that have been recorded in a recording medium (a CD-R, a DVD, an MD, and a Memory Stick), by a printer that reproduces the image data as a hard copy, and by an automatic performance instrument that automatically reproduces the audio data.

Meanwhile, there has been known a system for appreciation of images by using an output device such as a printer or a monitor that reproduces image data obtained by an imaging device such as a digital camera or a digital camcorder, or image data obtained by reading images recorded on a photographic film with a scanner. In such a system, in order to improve quality of the images reproduced by the system, image processing of various kinds is carried out on the image data.

For example, there has been proposed a method of improving quality of a reproduced image by carrying out image processing such as edge enhancement and contrast enhancement on image data read from a photographic film, based on photography information obtained at the time of photographing, such as information on a photographing distance, serial photographing, flash emission, shutter speed, and subject luminance (Japanese Unexamined Patent Publication No. 7(1995)-159904).

Furthermore, since each human face attracts the most attention in an image, a method of changing degrees of edge enhancement processing and tone processing in accordance with presence/absence and a size of a face area recognized in the image has also been proposed (Japanese Unexamined Patent Publication No. 9(1997)-233423).

Moreover, a method of obtaining a reproduced image in appropriate color balance has also been proposed (Japanese Unexamined Patent Publication No. 9(1997)-181918). In this method, a representative value representing a characteristic of a photographic film (such as a reference value on a high-density side or on a low-density side) is found for each of image data sets representing images recorded in the photographic film and a condition for converting the image data sets is determined based on the representative value.

Another method of compensating a difference in characteristics of imaging devices has also been proposed. In this method, a device characteristic such as a color reproduction characteristic or a tone reproduction characteristic is found for each imaging device by photographing a color chart with the imaging device, and correction that is appropriate for the device is carried out on image data based on information related to the model of the imaging device attached to the image data as tag information.

However, a wide variety of imaging devices are in use, and new models come on the market everyday. Therefore, finding the device characteristic for each of the imaging devices available on the market requires a vast labor force. Furthermore, since the device characteristic changes with a photographing condition such as AE/AWB setting, appropriate image correction for all photographing conditions is substantially difficult.

Meanwhile, each viewer appreciates a color in an image, such as a skin color or a color of the sky or foliage, indifferent manner, depending on memories and a childhood environment of the viewer, for example. Therefore, preferable colors, that is, a preferable image quality varies between viewers. If image data are corrected by the method described in Japanese Unexamined Patent Publication No. 7(1995)-159904, for example, an image represented by the image data can be corrected comparatively well on average. However, it is rare for all viewers to be satisfied, and the image may not be preferable for some of the viewers. For this reason, if a user wishes to obtain the image in a quality satisfactory for him/her when the corrected image data are printed, the user needs to correct the image again by notifying a color correction instruction or the like to a printing agency or the like after viewing the print. As a result, acquisition of optimal quality image is time-consuming.

In the case where the image is displayed on a monitor, correction of the image data by adjusting a color correction control of the monitor or by manual correction is necessary. However, this correction requires experience and correction for optimal image quality is difficult. Since a wide variety of monitors are also available and new models come to the market everyday, satisfactory image correction regarding a quality of an image displayed on one monitor may not necessarily be satisfactory for the same image displayed on another monitor.

As has been described above, since a troublesome operation is necessary for reproduction of image data in an optimal quality, a user has to accept the image even if the image is not ideal for the user.

In the above system for appreciation, the data are stored in their original forms, and format conversion such as enlargement/reduction (in the case of image data) or DA conversion (in the case of audio data) is carried out in accordance with a format of the reproduction apparatus. However, the data after the format conversion may not necessarily be appropriate for appreciation.

In the case of audio data recorded privately, the audio data are rarely appreciable due to a recording level being too high or too low or fluctuating, or due to a noise or unnecessary sounds. Therefore, processing for causing the audio data to become appreciable has been desired.

SUMMARY OF THE INVENTION

The present invention has been conceived based on consideration of the above circumstances. An object of the present invention is therefore to provide an appreciation data correction method and an appreciation data correction apparatus for respectively and easily carrying out processing that is preferable for appreciation on image data or the like, and to provide a computer-readable recording medium recorded with a program that causes a computer to execute the appreciation data correction method.

An appreciation data correction method of the present invention comprises the steps of:

calculating an optimal correction parameter used for carrying out aesthetic processing on a target appreciation data set added with specific classification information, based on specific correction parameters for specific appreciation data sets added with the specific classification information among correction parameters calculated in advance for carrying out the aesthetic processing on appreciation data sets added with predetermined classification information including the specific information; and obtaining a corrected appreciation data set by carrying out the aesthetic processing on the target appreciation data set, based on the optimal correction parameter.

The "appreciation data sets" refer to sets of digital data appreciable by the sense of sight or hearing, such as image data sets, audio data sets, and moving-image data sets.

The "predetermined classification information" refers to information according to which the appreciation data sets can be classified. For example, information for specifying a user who obtained the appreciation data sets (such as a user ID), and/or information for specifying a device by which the appreciation data sets were obtained (such as a device ID) can be used as the classification information. In the case of image data sets, information on a subject, use of the image data sets, and location in which the image data sets were obtained can be used as the classification information. The classification information can be added to the appreciation data sets by being written in a header of each of the appreciation data sets or as text data unified with the appreciation data sets, for example.

The "aesthetic processing" refers to processing to improve an aesthetic effect on the appreciation data sets. In the case of image data sets and moving-image data sets, image processing to improve image quality can be included as the aesthetic processing. Processing to change a tone of a voice by using an echo can also be used as the aesthetic processing for the case of audio data sets, for example.

The "correction parameters" refer to parameters for carrying out the aesthetic processing on the appreciation data sets. For example, if the aesthetic processing is image processing, parameters for the image processing (such as a color correction parameter and a sharpness enhancement parameter) is included in the correction parameters. The correction parameters are calculated in advance by manually carrying out the aesthetic processing on the appreciation data sets for an optimal aesthetic effect, for example.

Therefore, the optimal correction parameter for carrying out the aesthetic processing on the target appreciation data set added with information on a specific user (such as a user ID) is calculated based on the specific correction parameters for the specific appreciation data sets added with the same user ID. The aesthetic processing is then carried out on the target appreciation data set added with the same user ID, based on the optimal correction parameter.

In the appreciation data correction method of the present invention, a correction function for calculating the optimal correction parameter may be calculated based on the specific correction parameters and the specific appreciation data sets so that the optimal correction parameter can be calculated based on the correction function.

The appreciation data correction method of the present invention may further comprise the steps of:

calculating in advance correction functions for calculating the optimal correction parameter for respective pieces of the specific classification information, based on the specific appreciation data sets and the specific correction parameters;

selecting a corresponding one of the correction functions in accordance with the specific classification information added to the target appreciation data set, based on the specific classification information added to the target appreciation data set; and calculating the optimal correction parameter, based on the correction function that has been selected.

In the case where the correction functions are calculated in the appreciation data correction method of the present invention, it is preferable for correction function calculation appreciation data sets to be selected from the specific appreciation data sets based on predetermined priority so that the correction function for calculating the optimal correction parameter can be calculated based on the correction function calculation appreciation data sets and a corresponding portion of the specific correction parameters for the correction function calculation appreciation data sets, without using all of the specific appreciation data sets.

Calculating "the correction function for calculating the optimal correction parameter, based on the correction function calculation appreciation data sets and the corresponding portion of the specific correction parameters for the correction function calculation appreciation data sets" refers to calculating the correction function by using the specific appreciation data sets that have the latest date of aesthetic processing, the specific appreciation data sets having a large number of accesses meaning highly effective aesthetic processing thereon, the specific appreciation data sets having been subjected to a manual operation for more optimal aesthetic processing, the specific appreciation data sets favored by the user, or the specific appreciation data sets making more profit in the case of the specific appreciation data sets being chargeable, and the corresponding portion of the specific correction parameters for the specific appreciation data sets described above.

In other words, the specific appreciation data sets having higher priority have been subjected to the latest aesthetic processing or highly effective aesthetic processing. Therefore, by using such specific appreciation data sets and the specific correction parameters therefor, the correction function for finding the optimal correction parameter enabling better aesthetic processing can be calculated.

The appreciation data correction method of the present invention may further comprise the steps of:

calculating in advance correction functions for calculating the optimal correction parameter for respective pieces of the specific classification information, based on correction function calculation appreciation data sets selected from the specific appreciation data sets according to predetermined priority and a corresponding portion of the specific correction parameters for the correction function calculation appreciation data sets;

selecting a corresponding one of the correction functions in accordance with the specific classification information added to the target appreciation data set, based on the specific classification information added to the target appreciation data set; and calculating the optimal correction parameter, based on the correction function that has been selected.

In the case of image data sets, a user in a viewing environment extremely different from others or a user dealing with photographs different from general photographs (such as a user dealing with endoscope photographs, microscope photographs, and astronomical photographs) often carries out image processing different from image processing for general photographs. Furthermore, the correction parameters for the image processing completely different from the image processing for general photographs may be calculated due to an erroneous operation or an evil intention of such a user. Therefore, the aesthetic processing appropriate for the target appreciation data set cannot be carried out by using the correction parameter found from the correction function for such appreciation data sets (hereinafter referred to as heterogeneous data sets) and the correction parameters therefor.

Therefore, the specific appreciation data sets other than the heterogeneous data sets may be selected according to the predetermined priority so that the heterogeneous data sets are prevented from being used for calculating the correction functions.

In the appreciation data correction method of the present invention, it is preferable for the correction functions to be calculated based on low-volume appreciation data sets of the specific appreciation data sets. This is because the operation time for calculating the correction functions can be shortened in this manner.

The "low-volume appreciation data sets" refer to the appreciation data sets whose data sizes have been respectively reduced. In the case of image data sets, low-resolution image data sets each having fewer pixels can be used as the low-volume appreciation data sets.

In the case where the correction functions are calculated in advance, it is preferable for the correction functions to be updated regularly. This is because the correction functions enabling the latest aesthetic processing can be generated in advance.

It is preferable for the appreciation data correction method of the present invention to further comprise the steps of:

calculating a general correction parameter for general aesthetic processing, based on the correction parameters; and carrying out the aesthetic processing on the target appreciation data set, based on the general correction parameter in addition to the optimal correction parameter.

The "general correction parameter" is a correction parameter enabling the aesthetic processing to give an aesthetic effect on average, regardless of the classification information. The general correction parameter is calculated based on the correction parameters for the appreciation data sets in large quantities.

By carrying out the aesthetic processing on the target appreciation data set based on the general correction parameter as well as the optimal correction parameter, the aesthetic processing not biased by the classification information can be carried out on the target appreciation data set.

Although the corrected appreciation data set obtained by the appreciation data correction method of the present invention produces an optimal aesthetic effect, output devices for outputting the data set vary greatly and have output characteristics different from each other. Therefore, depending on a model of the output device, the aesthetic effect may be reduced.

For this reason, it is preferable for the appreciation data correction method of the present invention to further comprise the step of correcting the corrected appreciation data set according to the output characteristic of the output device.

An appreciation data correction apparatus of the present invention comprises:

correction parameter calculation means for calculating an optimal correction parameter used for carrying out aesthetic processing on a target appreciation data set added with specific classification information, based on specific correction parameters for specific appreciation data sets added with the specific classification information among correction parameters calculated in advance for carrying out the aesthetic processing on appreciation data sets added with predetermined classification information including the specific classification information; and aesthetic processing means for obtaining a corrected appreciation data set by carrying out the aesthetic processing on the target appreciation data set, based on the optimal correction parameter.

In the appreciation data correction apparatus of the present invention, it is preferable for the predetermined classification information to include information specifying a user who obtained the appreciation data sets and/or information specifying a device by which the appreciation data sets were obtained.

The appreciation data correction apparatus of the present invention may further comprise correction function calculation means for calculating a correction function used for calculating the optimal correction parameter based on the specific appreciation data sets and the specific correction parameters so that the correction parameter calculation means can calculate the optimal correction parameter, based on the correction function.

The appreciation data correction apparatus of the present invention may further comprise:

correction function calculation means for calculating in advance correction functions used for calculating the optimal correction parameter for respective pieces of the specific classification information, based on the specific appreciation data sets and the specific correction parameters;

correction function storing means for storing the correction functions that have been calculated; and selection means for selecting a corresponding one of the correction functions in accordance with the specific classification information added to the target appreciation data set, based on the specific classification information added to the target appreciation data set so that the correction parameter calculation means can calculate the optimal correction parameter, based on the correction function that has been selected.

When the correction function is calculated by the appreciation data correction apparatus of the present invention, correction function calculation appreciation data sets are preferably selected from the specific appreciation data sets, based on predetermined priority. In this manner, the correction function used for calculating the optimal correction parameter can be calculated based on the correction function calculation appreciation data sets that have been selected and a corresponding portion of the specific correction parameters therefor, without using all the specific appreciation data sets.

The appreciation data correction apparatus of the present invention may further comprise:

correction function calculation means for calculating in advance correction functions used for calculating the optimal correction parameter for respective pieces of the specific classification information, based on correction function calculation appreciation data sets selected from the specific appreciation data sets according to a predetermined priority and a corresponding portion of the specific correction parameters for the correction function calculation appreciation data sets;

correction function storing means for storing the correction functions that have been calculated; and selection means for selecting a corresponding one of the correction functions in accordance with the specific classification information added to the target appreciation data set, based on the specific classification information added to the target appreciation data set, so that the correction parameter calculation means can calculate the optimal correction parameter, based on the correction function that has been selected.

In the appreciation data correction apparatus of the present invention, it is preferable for the correction function calculation means to calculate the correction function based on low-volume appreciation data sets of the specific appreciation data sets.

Furthermore, it is preferable for the appreciation data correction apparatus of the present invention to further comprise updating means for regularly updating the correction functions.

In the appreciation data correction apparatus of the present invention, it is preferable for the correction parameter calculation means to calculate a general correction parameter used for general aesthetic processing, based on the correction parameters. In this manner, the aesthetic processing means can carry out the aesthetic processing on the target appreciation data set, based on the general correction parameter in addition to the optimal correction parameter.

It is also preferable for the appreciation data correction apparatus of the present invention to further comprise correction means for correcting the corrected appreciation data set in accordance-with a characteristic of an output device that outputs the corrected appreciation data set.

The appreciation data correction method of the present invention may be provided as a program recorded in a computer-readable recording medium that causes a computer to execute the appreciation data correction method.

According to the present invention, the optimal correction parameter for carrying out the aesthetic processing on the target appreciation data set added with the specific classification information is calculated based on the specific correction parameters for the specific appreciation data sets added with the specific classification information. Therefore, the optimal correction parameter can be used for the aesthetic processing for an optimal aesthetic effect on the appreciation data sets classified by the specific classification information. As a result, by carrying out the aesthetic processing using the optimal correction parameter on the appreciation data sets added with the specific classification information, the optimal aesthetic effect can be produced for the appreciation data sets, without a troublesome operation therefor.

DESCRIPTION OF THE PREFERRED EMBODIMENTS

Figure 1:
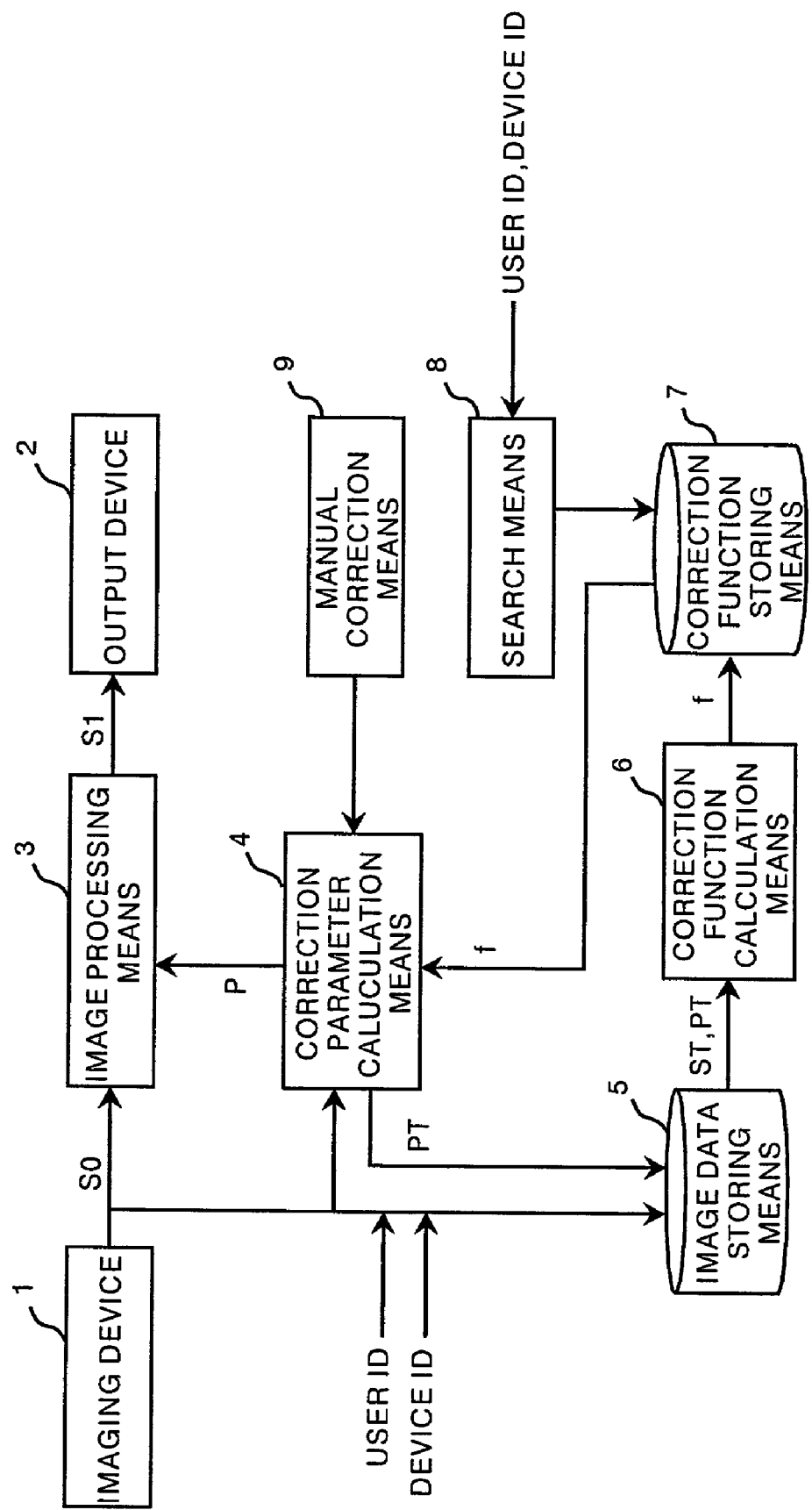
FIG. 1 is a block diagram showing a configuration of an image output system adopting an image data correction apparatus of a first embodiment of the present invention.

Hereinafter, embodiments of the present invention will be explained with reference to the accompanying drawings. FIG. 1 is a block diagram showing a configuration of an image output system adopting an image data correction apparatus of a first embodiment of the present invention. As shown in FIG. 1, the image output system obtains corrected image data sets S1 by carrying out image processing on target image data sets S0 obtained by an imaging device 1 such as a digital camera, a scanner for reading images from a photographic film, or a digital camcorder, and reproduces the corrected image data sets S1 by using an output device 2 such as a printer or a monitor. The image output system comprises image processing means (aesthetic processing means) 3 for obtaining the corrected image data sets S1 by carrying out the image processing on the target image data sets S0, correction parameter calculation means 4 for calculating correction parameters P used for carrying out the image processing on the image data sets S0, image data storing means 5 for storing the image data sets S0 as storage image data sets Ss together with confirmed correction parameters PT determined as will be explained later, correction function calculation means 6 for calculating correction functions f for correcting the image data sets S0 based on the storage image data sets Ss, correction function storing means 7 for storing the correction functions f, search means 8 for searching for the correction functions f, and manual correction means 9 for manually correcting an image reproduced by the output device 2.

The image processing means 3 is used for the image processing carried out generally on photographic images, such as color tone correction processing (using gamma correction and LUT), noise reduction processing such as sharpness processing and smoothing processing, red-eye correction processing, scar removing processing for eliminating a scar in an image, wrinkle removing processing for removing wrinkles on a human face in the image, background elimination processing for removing a background, partial blur processing for causing a portion of the image to become blurry, and camera shake correction processing. The image processing is carried out based on the correction parameters P calculated by the correction parameter calculation means 4.

The correction parameter calculation means 4 calculates the correction parameters P used for the image processing carried out by the image processing means 3 on the target image data sets S0, based on an input from the manual correction means 9 and the correction functions f stored in the correction function storing means 7. As will be explained later, the correction functions f are calculated based on the correction parameters P found for the target image data sets S0. Therefore, before the number of the storage image data sets Ss in the image data storing means 5 reaches some magnitude, the correction functions f cannot be obtained. Therefore, before the correction functions f are obtained, the correction parameter calculation means 4 determines the correction parameters P by changing the correction parameters P according to manual correction carried out with use of the manual correction means 9 on the image output from the output device 2.

The image data storing means 5 stores the image data sets S0 as the storage image data set Ss after adding to the image data sets S0 the correction parameters PT that have been determined and classification information such as user IDs for specifying users who obtained the image data sets S0 and/or device IDs for specifying respective models of the imaging device with which the image data sets S0 have been obtained. The image data storing means 5 is a database for storing the storage image data sets Ss over a long term and generally has a capacity of tens to thousands of terabytes. The image data storing means is accessible via a public communication line such as the Internet.

The correction function calculation means 6 calculates the correction functions f for each of the user IDs and/or for each of the device IDs, based on specific image data sets ST (having a specific one of the user IDs and/or a specific one of the device IDs) among the storage image data sets Ss stored in the image data storing means 5 and based on the correction parameters PT added to the respective specific image data sets ST.

The correction function storing means 7 stores the correction functions f calculated by the correction function calculation means 6 in relation to the information (such as the specific user ID and/or the specific device ID) for specifying the image data sets ST for which the correction functions f have been found.

The search means 8 searches the correction function storing means 7 for the correction functions f related to the specific user ID and/or the specific device ID input from input means such as a mouse and a keyboard which are not shown, and inputs the correction functions f that have been found to the correction function calculation means 6.

The manual correction means 9 corrects the correction parameters P calculated by the correction parameter calculation means 4, based on manual correction information input from the input means, such as fine adjustment of colors, noise reduction, and tones. In the case where the output device 2 is a monitor, the manual correction can be carried out in a state where the corrected image data set S1 is being displayed on the output device 2.

Figure 2:
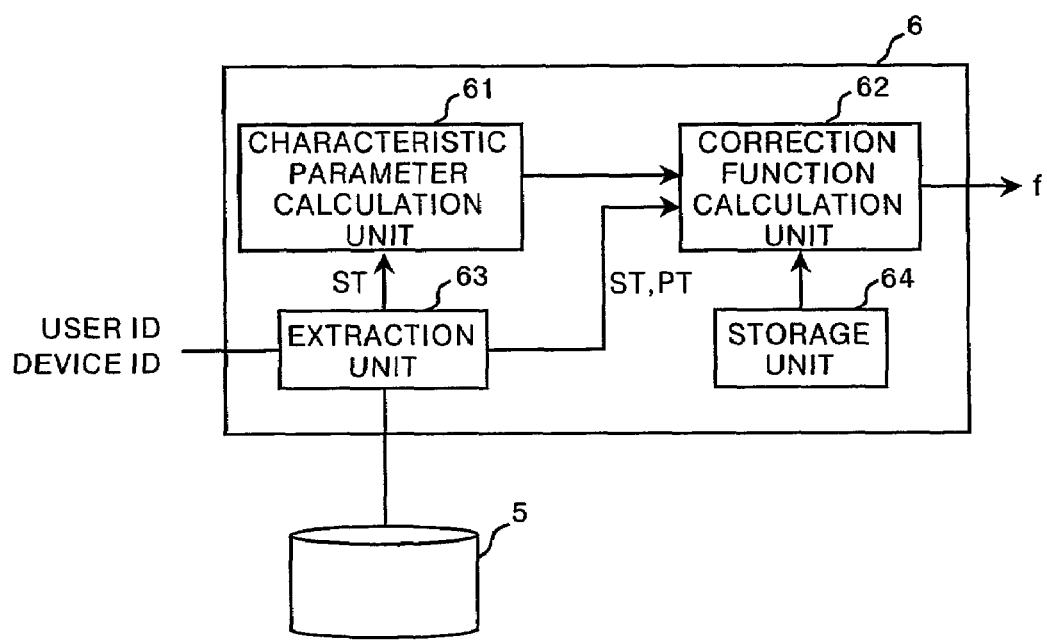
FIG. 2 is a block diagram showing a configuration of correction function calculation means.

Calculation of the correction functions f by the correction function calculation means 6 will be explained next. FIG. 2 is a block diagram showing a configuration of the correction function calculation means 6. As shown in FIG. 2, the correction function calculation means 6 comprises a characteristic parameter calculation unit 61 for calculating characteristic parameters for the respective specific image data sets ST added with the specific user ID and/or the specific device ID (in this case, only the user ID is added) among the storage image data sets Ss in the image data storing means 5, a correction function calculation unit 62 for calculating the correction functions f based on the characteristic parameters calculated by the characteristic parameter calculation unit 61, an extraction unit 63 for extracting the specific image data sets ST from the storage image data sets SS in the image data storing means 5, and a storage unit 64 for storing primitive functions used as bases for calculating the correction functions f.

The extraction unit 63 extracts, from the storage image data sets Ss in the image data storing means 5, the specific image data sets added with the specific user ID (hereinafter referred to as STi [i=1~N] where N is the number of the image data sets ST added with the specific user ID), and inputs the extracted image data sets to the characteristic parameter calculation unit 61 and to the correction function calculation unit 62. The respective specific image data sets STi are added with the confirmed correction parameters PT, and the correction parameters PT are also input to the correction function calculation unit 62.

The characteristic parameter calculation unit 61 calculates a characteristic parameter group comprising the characteristic parameters (hereinafter referred to as xi, yi, zi, pi, qi, ri), for images represented by the specific image data sets STi. The characteristic parameters xi, yi, zi correspond to CIE_XYZ values of an average of each of the specific image data sets STi, while pi, qi, and ri respectively correspond to an mean value of a gray histogram of each of the specific image data sets STi, a standard deviation of the gray histogram, and a median value of the gray histogram. The characteristic parameters are not limited to the above parameters, and other parameters can be used. For example, the characteristic parameters may be mean values of a bright area and a dark area in each of the images, mean values for a center area and a peripheral area therein, a mean value for a human face area recognized therein, a component of a specific frequency band in frequency spaces in each of the specific image data sets STi, and a variance of a frequency spectrum of each frequency band, for example. In the case where the characteristic parameters are found for each of the areas in the images represented by the specific image data sets STi (such as the human face area or a sky area) or for each of the colors in the frequency components, the number of the characteristic parameters can be hundreds of thousands. Pixel values of the images represented by the specific image data sets STi may also be used as the characteristic parameters. In order to calculate the correction functions f, it is preferable for the specific image data sets STi to be converted into a color space not dependent on the imaging device 1, such as the CIE_XYZ tristimulus values or Lab color space.

Primitive functions that determine relationships between the characteristic parameter group and the correction parameters PT added to the specific image data sets STi are found according to Equations (1) below:

$$Pa = fa(x,y,z,p,q,r)$$

$$Pb = fb(x,y,z,p,q,r)$$

$$Pc = fc(x,y,z,p,q,r) \qquad (1)$$

where Pa, Pb and Pc are the correction parameters PT for a slope of tones, a correction degree for the skin-color area, and sharpness correction, respectively. Meanwhile, fa, fb, and fc are the primitive functions for determining the relationships between the characteristic parameter group and the correction parameters Pa, Pb, and Pc, respectively.

High-degree polynomial functions shown by Equations (2) to (4) below are used as the primitive functions fa, fb, and fc:

$$a = a0 + a1*x + a2*y + a3*z + a4*p + a5*q + a6*r + a7*x*y + a8*x*z + a9*y*z + a10*x^2 + a11*y^2 + a12*z^2 + a13*p*x*y*z + a14*q*x*y*z \quad (2)$$

$$b = b0 + b1*x + b2*y + b3*z + b4*p + b5*q + b6*r + b7*x*y + b8*x*z + b9*y*z + b10*p*x*y*z + b11*q*x*y*z + b12*p*q*r \quad (3)$$

$$c = c0 + c1*x + c2*y + c3*z + c4*p + c5*q + c6*r + c7*x*y + c8*x*z + c9*y*z* + c10*x^2 + c11*y^2 + c12*z^2 + c13*p*q*r \quad (4)$$

The primitive functions such as the functions in Equations (2) to (4) are stored in the storage unit 64.

The correction function calculation unit 62 finds the correction functions fa, fb, and fc, (that is, the coefficients a0~a14, b0~b12, and c0~c12 in Equations (2) to (4)) in the following manner. First, N sets of the specific image data sets STi are extracted by the extraction unit 63 and correlated to the correction parameters PT added to the specific image data sets STi (hereinafter referred to as Pai, Pbi, Pci) according to Equations (5) to (7) below:

$$Pai = fa(xi, yi, zi, pi, qi, ri) - \epsilon Pai \quad (5)$$

$$Pbi = fb(xi, yi, zi, pi, qi, ri) - \epsilon Pbi \quad (6)$$

$$Pci = fc(xi, yi, zi, pi, qi, ri) - \epsilon Pci \quad (7)$$

where $\epsilon$ is an error. The correction functions fa, fb, and fc are found by finding the coefficients a0~a14, b0~b12, and c0~c12 that cause the error $\epsilon$ to become minimal. The correction functions fa, fb, and fc found in the above manner are stored in the correction function storing means 7.

In some cases, the error $\epsilon$ does not become small enough in Equations (5) to (7). For this reason, the primitive functions in higher degrees and having more terms are stored in the storage unit 64 so that the correction functions causing the error $\epsilon$ to become minimal can be found by using the primitive functions in higher degrees. In the case where the error $\epsilon$ does not become small enough by using the higher-degree primitive functions, the primitive functions in much higher degrees and having more terms are used, and the operation above is repeated until the error $\epsilon$ becomes small enough. In this manner, the correction functions fa, fb, and fc are determined.

In the case where the correction functions fa, fb, and fc are found for the specific image data sets ST added with the specific user ID, the corrected image data sets S1 enabling reproduction of images optimal for the user represented by the specific user ID can be obtained if the image processing using the correction parameters P found by using the correction functions fa, fb, and fc is carried out on the image data sets S0 added with the specific user ID. Furthermore, in the case where the correction functions fa, fb, and fc are found for the specific image data sets ST added with the specific device ID, quality of the images represented by the image data sets S0 obtained by the imaging device 1 corresponding to the device ID becomes optimal if the image processing using the correction parameters P found by using the correction functions fa, fb, and fc is carried out on the image data sets S0 added with the specific device ID.

Meanwhile, the image data storing means 5 stores the image data sets S0 obtained by various users with the imaging device 1 of various models, as the storage image data sets Ss added with the confirmed correction parameters PT. Therefore, in the case where the correction functions f are found by using all the storage image data sets Ss in the image data storing means 5, the corrected image data sets S1 can reproduce images of average quality if the image processing using the correction parameters P found by using the correction functions f is carried out on the image data sets S0.

Figure 3:
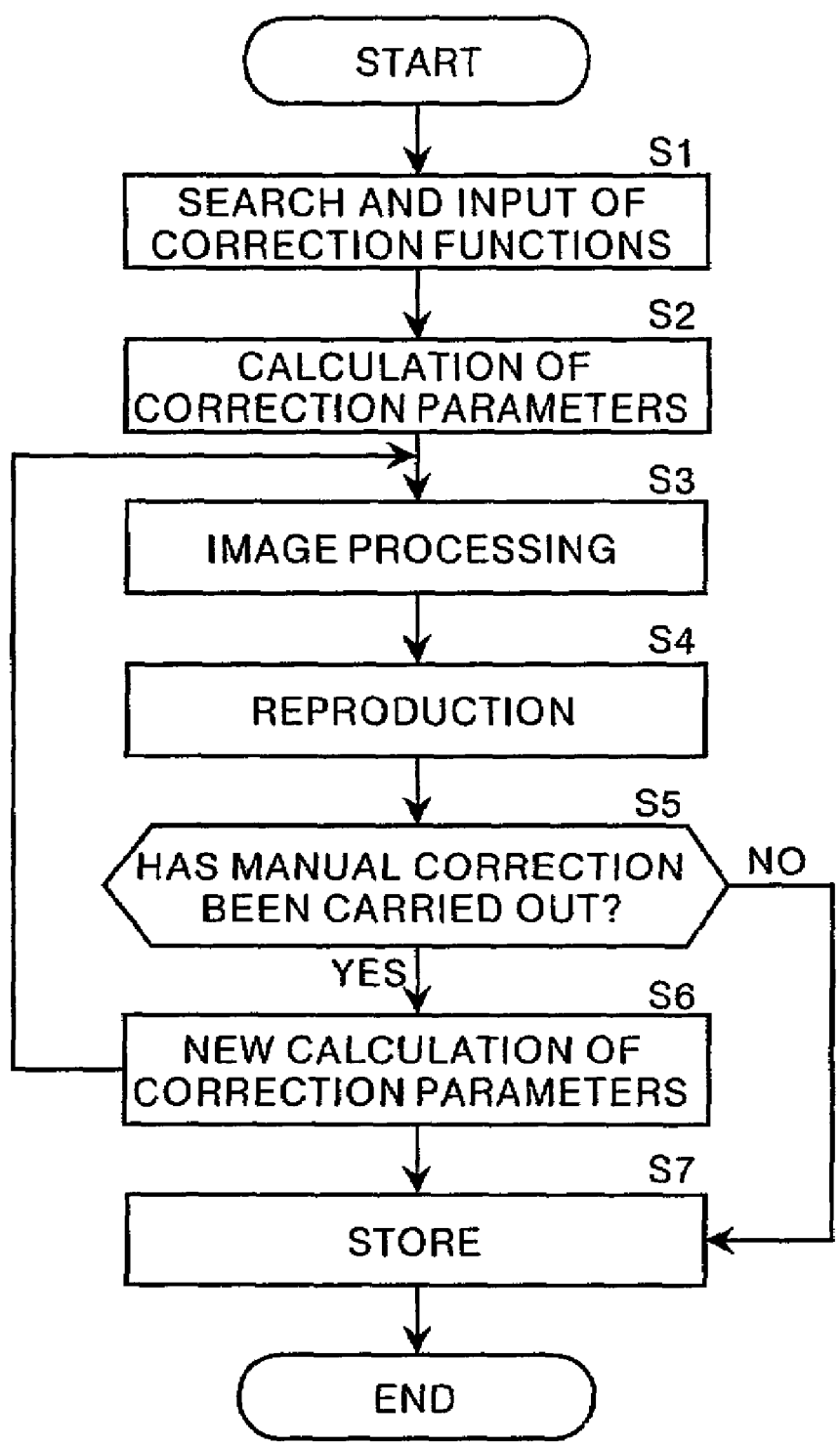
FIG. 3 is a flow chart showing operation of the first embodiment.

Operation of the first embodiment will be explained next. FIG. 3 is a flow chart showing a procedure carried out in the first embodiment. In the first embodiment, the image data storing means 5 stores, as the storage image data sets Ss, the image data sets S0 added with the confirmed correction parameters PT and the user IDs and/or the device IDs. Based on the storage image data sets Ss and the correction parameters PT added thereto, the correction functions f are found for each of the user IDs and/or each of the device IDs by the correction function calculation means 6, and stored in the correction function storing means 7. The image processing is carried out based on the user IDs in the explanation below.

Based on the user ID added to the target image data sets S0 (that is, based on the specific user ID), the search means 8 searches the correction function storing means 7 for the correction functions f related to the specific user ID, and inputs the correction functions f that have been found to the correction parameter calculation means 4 (Step S1). The correction parameter calculation means 4 calculates the correction parameters P for the image processing to be carried out on the target image data sets S0, based on the correction functions f that have been found (Step S2). The image processing means 3 carries out the image processing on the target image data sets S0 by using the correction parameters P that have been calculated, and obtains the corrected image data sets S1 (Step S3). The output device 2 reproduces the corrected image data sets S1 (Step S4). Whether or not the manual correction with use of the manual correction means 9 has been carried out is then judged (Step S5). If a result at Step S5 is affirmative, the correction parameters P according to the manual correction are newly calculated (Step S6), and the procedure returns to Step S3. The procedure from Step S3 to Step S5 is then repeated.

If the result at Step S5 is negative, the correction parameters P are confirmed and added to the target image data sets S0 as the confirmed correction parameters PT. The image data sets S0 added with the confirmed correction parameters PT are then stored as the storage image data sets Ss in the image data storing means 5 (Step S7) to end the procedure.

The storage image data sets Ss and the confirmed correction parameters PT in the image data storing means 5 are used for updating the correction functions f as will be explained later.

As has been described above, in this embodiment, the correction functions f are found for each of the users and/or for the imaging device of each model, based on the storage image data sets Ss in the image data storing means 5, and the image processing is carried out on the target image data sets S0 after the correction parameters P are calculated based on the correction functions f. Therefore, the corrected image data sets S1 having been subjected to the optimal image processing for each of the users and/or each model of the imaging device can be obtained without a troublesome operation.

Since the correction functions f for each of the user IDs and/or for each of the device IDs are stored in the correction function storing means 7, the correction parameters P enabling the optimal image processing on the target image data sets S0 can be calculated by simply reading the correction functions f corresponding to the specific user ID and/or the specific device ID from the correction function storing means 7, based on the specific user ID and/or the specific device ID. In this manner, the operation time necessary for the image processing can be shortened.

Figure 4:
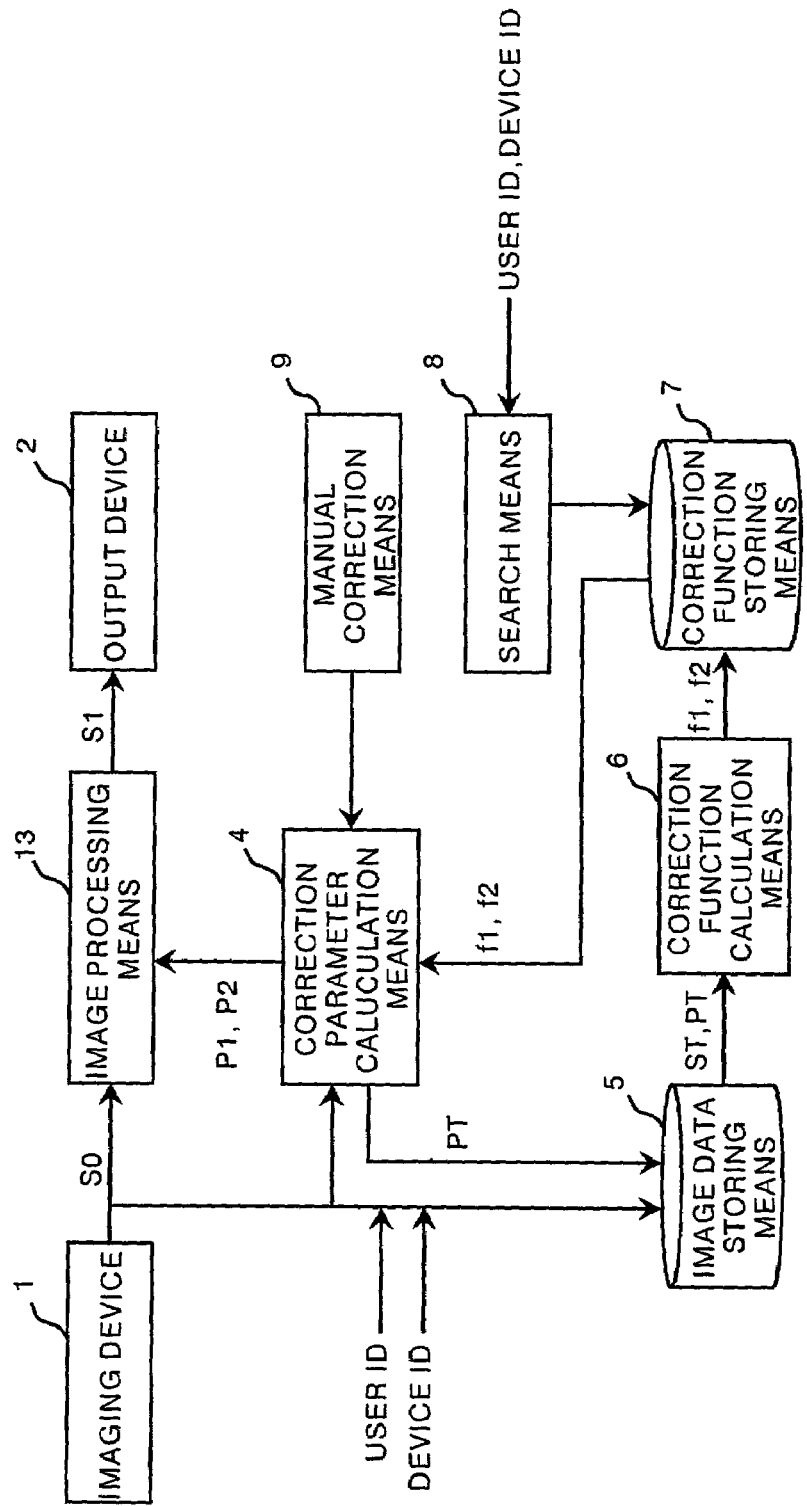
FIG. 4 is a block diagram showing a configuration of an image output system adopting an image data correction apparatus of a second embodiment of the present invention.

A second embodiment of the present invention will be explained next. FIG. 4 is a block diagram showing a configuration of an image output system adopting an appreciation data correction apparatus of the second embodiment of the present invention. In the first embodiment described above, the correction parameter calculation means 4 calculates the correction functions f for each of the users and/or for the imaging device of each model. However, in the second embodiment, correction functions f1 for all storage image data sets Ss stored in image data storing means 5 and correction functions f2 for a specific user and/or an imaging device of a specific model are calculated. Image processing is carried out on target image data sets S0 by using correction parameters P1 and P2 that are found based on the correction functions f1 and f2.

Figure 5:
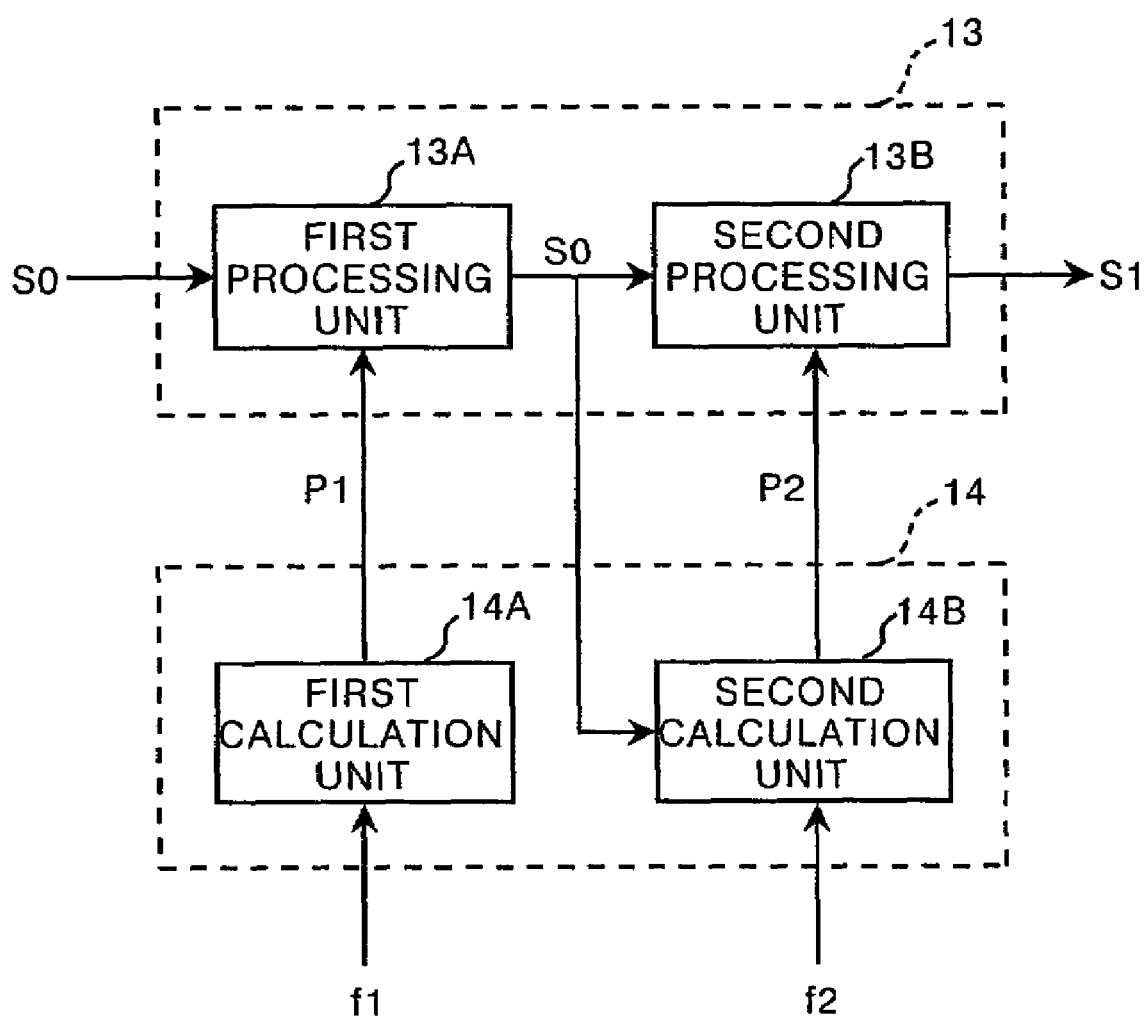
FIG. 5 is a block diagram showing configurations of image processing means and correction parameter calculation means in the second embodiment.

FIG. 5 is a block diagram showing configurations of image processing means 13 and correction parameter calculation means 14 in the second embodiment. As shown in FIG. 5, the image processing means 13 in the second embodiment comprises a first processing unit 13A for obtaining interim image data sets S0' by carrying out first image processing using the correction parameters P1 on the image data sets S0 and a second processing unit 13B for obtaining corrected image data sets S1 by carrying out second image processing using the correction parameters P2 on the interim image data sets S0'. The correction parameter calculation means 14 comprises a first calculation unit 14A for calculating the correction parameters P1 based on the correction functions f1 for all the storage image data sets Ss stored in the image data storing means 5 and a second calculation unit 14B for calculating the correction parameters P2 based on the correction functions f2 searched by search means 8 based on a specific user ID and/or a specific device ID.

Figure 6:
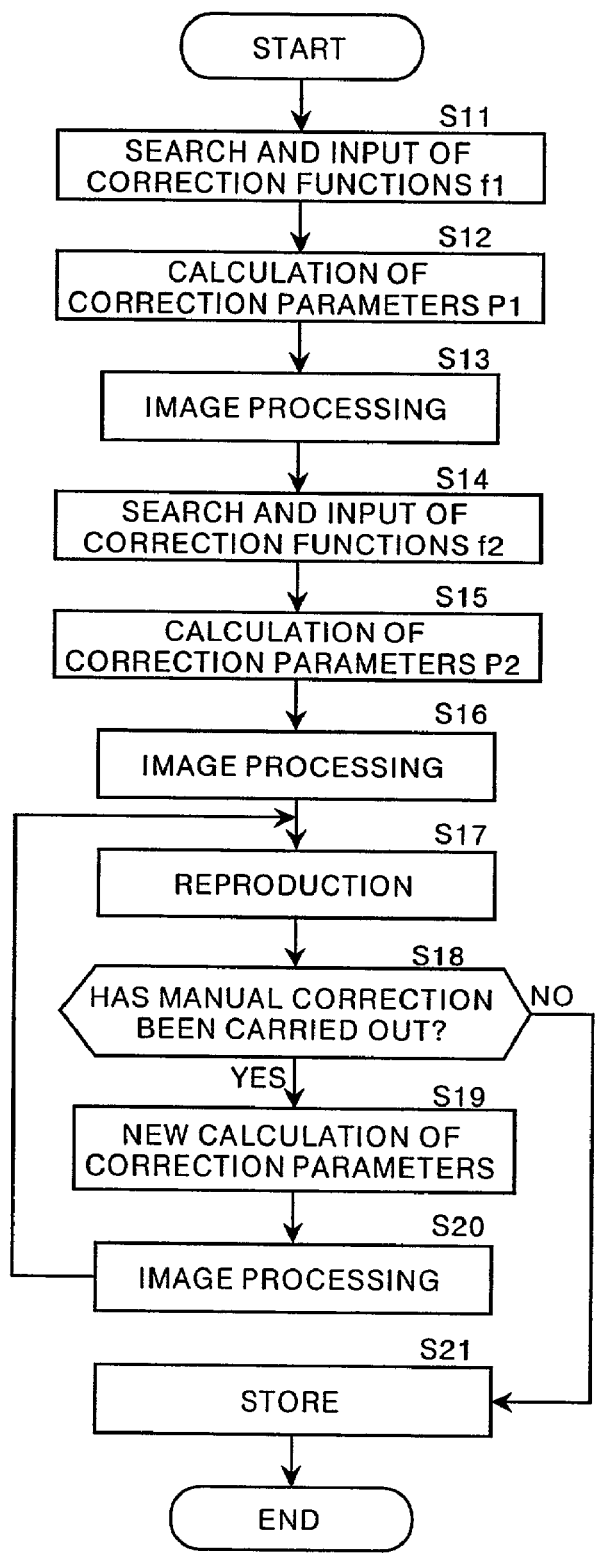
FIG. 6 is a flow chart showing operation of the second embodiment.

Operation of the second embodiment will be explained next. FIG. 6 is a flow chart showing a procedure carried out in the second embodiment. The search means 8 searches correction function storing means 7 for the correction functions f1 for all the storage image data sets Ss in the image data storing means 5, and inputs the correction functions f1 to the first calculation unit 14A (Step S11). The first calculation unit 14A calculates the correction parameters P1 for the image processing to be carried out on the image data sets S0, based on the correction functions f1 (Step S12). The first processing unit 13A carries out the image processing on the image data sets S0 by using the correction parameters P1, and the interim image data sets S0' are obtained (Step S13). The search means 8 searches the correction function storing means 7 for the correction functions f2 related to the specific user ID and/or the specific device ID, and inputs the correction functions f2 to the second calculation unit 14B (Step S14). The second calculation unit 14B calculates the correction parameters P2 for the image processing on the interim image data sets S0', based on the correction functions f2 (Step S15). The second processing unit 13B carries out the image processing on the interim image data sets S0' based on the correction parameters P2 that have been calculated, and obtains the corrected image data sets S1 (Step S16). An output device 2 then reproduces the corrected image data sets S1 (Step S17). Whether or not manual correction has been carried out with use of manual correction means 9 is then judged (Step S18). If a result at Step S18 is affirmative, new correction parameters P are then calculated based on the manual correction (Step S19), and image processing by using the correction parameters P is carried out (Step S20). The procedure returns to Step S17 and the procedure from Step S17 to Step S19 is repeated.

If the result at Step S18 is negative, the correction parameters P are confirmed and added to the image data sets S0 as confirmed correction parameters PT. The image data sets S0 added with the confirmed correction parameters PT are stored in the image data storing means 5 as the storage image data sets Ss (Step S21) to end the procedure.

As has been described above, according to the second embodiment, the image processing is carried out on the image data sets S0 by using the correction parameters P1 for all the storage image data sets Ss in the image data storing means 5. Therefore, the output device 2 can reproduce images of average quality. Furthermore, the image processing is further carried out based on the correction parameters P2 found according to the specific user ID and/or the specific device ID. As a result, the corrected image data sets S1 having been subjected to the image processing optimal for the specific user and/or the specific model of the imaging device can be obtained.

In the second embodiment, the correction parameter calculation means 14 comprises the first calculation unit 14A and the second calculation unit 14B to separately calculate the correction parameters P1 and P2 based on the correction functions f1 and f2. Furthermore, the first processing unit 13A and the second processing unit 13B of the image processing means 13 respectively carry out the image processing using the correction parameters P1 and P2. However, a composite function may be generated from the correction functions f1 and f2 so that a correction parameter is found from the composite correction function and used on the target image data sets S0. Hereinafter, this method will be explained as a third embodiment of the present invention.

Figure 7:
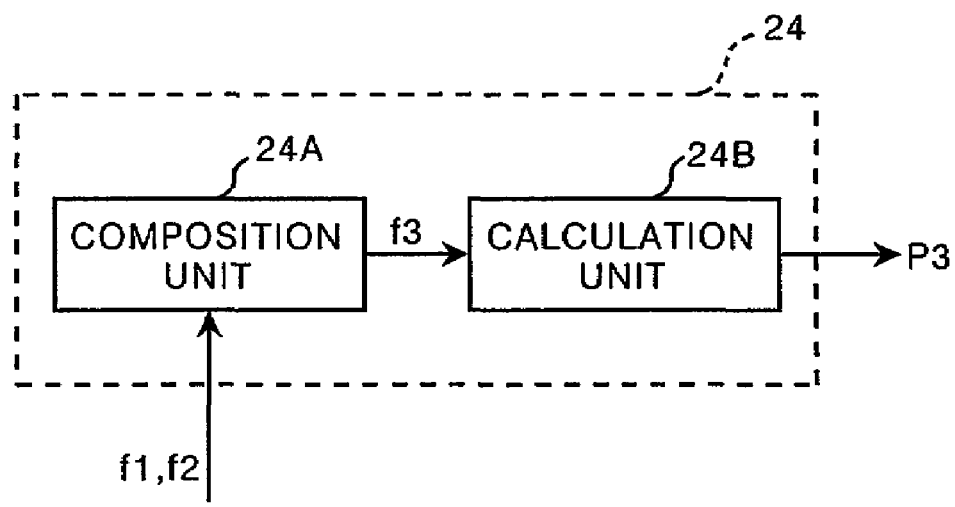
FIG. 7 is a block diagram showing a configuration of correction parameter calculation means in a third embodiment of the present invention.

FIG. 7 is a block diagram showing a configuration of correction parameter calculation means in the third embodiment. As shown in FIG. 7, correction parameter calculation means 24 comprises a composition unit 24A for finding a composite correction function f3 by composition of correction functions f1 and f2, and a calculation unit 24B for calculating a composite correction parameter P3 based on the composite correction function f3. Since the composite correction parameter P3 is found based on the composite correction function f3 generated from the correction functions f1 and f2, corrected image data sets S1 generated by correction of the image data sets S0 can be obtained easily as in the second embodiment.

In the first to third embodiments described above, the storage image data sets Ss added with the confirmed correction parameters PT are newly stored in the image data storing means 5 daily. Therefore, in order to carry out the image processing that is up to date, it is preferable for the correction functions f to be updated regularly by reflecting the correction parameters PT added to the image data sets Ss in the calculation of the correction functions f. However, the number of the storage image data sets Ss stored in the image data storing means 5 is huge. For example, according to an investigation carried out by the applicant, 200 image data sets are stored in the image data storing means 5 as the image data sets Ss for each user per year. Therefore, if the number of the users is 12 million per year, the image data storing means 5 stores 2.4 billion image data sets Ss (2.4 petabytes in capacity). If the image data sets Ss added with the specific device ID occupies 30% thereof, 180 terra bytes are necessary for storing only the image data sets Ss added with the specific device ID. In order to calculate the correction functions f from the huge image data sets Ss, the correction function calculation means 6 uses parallel image processors (256 processors of 800-MHz, for example). However, calculation of the correction functions f is time-consuming.

For this reason, it is preferable for the image data storing means 5 to store low-resolution image data sets L generated by reducing the number of pixels in each of the image data sets Ss, together with the image data sets Ss. When the correction functions f are calculated, the amount of calculation can be reduced by using the low-resolution image data sets L instead of the image data sets Ss, which leads to reduction in time necessary for calculating the correction functions f. The low-resolution image data sets L are used only for calculation of the correction functions fused for calculating the correction parameters P for colors and tones. The correction parameters P for sharpness enhancement processing, graininess reduction processing, and the like need to be calculated by using the correction functions f found from the storage image data sets Ss. For this reason, the correction functions f for calculating the correction parameters P for colors and tones are preferably updated everyday or every week by using the low-resolution image data sets L while the correction functions f for calculating the correction parameters P for the sharpness enhancement processing and the graininess reduction processing are preferably updated every week to every year by using the storage image data sets Ss.

The correction parameter calculation means 4, the image data storing means 5, the correction function calculation means 6, and the correction function storing means 7 comprise updating means.

When the correction functions f are calculated, the storage image data sets Ss used therefor may be selected, instead of using all the storage image data sets Ss added with the user IDs and/or the device IDs. For example, the storage image data sets Ss generated recently or accessed frequently are often in fashion, the storage image data sets Ss and the correction parameters PT added thereto are used with priority for calculating the correction functions f. Furthermore, since the image data sets Ss corrected manually often reflects preference of the respective users who corrected the image data sets, the preference can be reflected by using the storage image data sets Ss.

In order to select the storage image data sets Ss used for calculation of the correction functions f, the respective storage image data sets Ss may have flags indicating the date of generation, the number of accesses, and manual correction, for example. In the case where the users can access the image data storing means 5 via a network, the image data sets Ss accessed by the specific user may be added with a preference flag so that the image data sets Ss added with the preference flag can be used for updating the correction functions f. Furthermore, in the case where the storage image data sets Ss are copyrighted and thus chargeable for example, a charge therefor, an added value generated by the image processing (such as a selling price–the cost (a copyright fee or the like)), gross sales (the charge×sales figures), and a profit (the added value×the sales figures) may be related to the image data sets Ss and stored in the image data storing means 5. In this manner, only the image data sets Ss whose added value or the like exceeds a predetermined number can be used.

Moreover, some of the users who views the corrected image data sets S1 in an environment extremely different from others or some of the users who deal with photographs different from general photographs (such as endoscope photographs, microscope photographs and astronomical photographs) often carry out the image processing in a manner different from the image processing for general photographs. In some cases, the correction parameters P for the image processing which are completely different from the image processing for general photographs may be stored as the confirmed correction parameters PT added to the image data sets Ss in the image storing means 5 due to an erroneous operation or an evil intention. In the case where the correction functions f are found by using the image data sets Ss described above (hereinafter referred to as heterogeneous image data sets) and the correction parameters PT added thereto, the image data sets S0 cannot be subjected to the image processing appropriate therefor if the correction parameters P found by using the correction functions f are used for the image processing.

Therefore, it is preferable for the heterogeneous image data sets to be eliminated from calculation of the correction functions f. For this reason, the search means 8 may comprise a judgment unit for eliminating the heterogeneous image data sets. More specifically, some of the image data sets Ss added with the specific user ID are sampled and the correction parameters for the sampled image data sets Ss (hereinafter referred to as correction parameters PT1) are calculated by using all the correction functions f for all the storage image data sets Ss (the correction functions f1 in the second embodiment). The correction parameters PT1 and the correction parameters added to the sampled storage image data sets Ss (hereinafter referred to as correction parameters PT2) are then compared to each other. If the correction parameters PT2 are not in a range of ±3 σ (where σ is a standard deviation) in normal distribution of all the correction parameters PT1, the storage image data sets Ss added with the specific user ID are judged to be heterogeneous data sets and eliminated from calculation of the correction functions f for all the image data sets Ss and from calculation of the correction functions f for each device model. In this manner, the correction functions f can be calculated without an influence of the heterogeneous data sets.

In the above embodiment, the respective user IDs and/or the device IDs are added as the classification information to the storage image data sets Ss, and the correction functions f are calculated for each of the users and/or for each model of the imaging device. However, a subject ID for specifying a subject, a use ID for specifying a use, and GPS information representing a location and the time of generation may be added to each of the storage image data sets Ss as the classification information thereof. Based on the classification information, the correction functions f can be found for each subject ID, for each use ID or for each piece of GPS information.

For example, in the case where the image processing means 3 recognizes a human face area included in each of the images represented by the target image data sets S0 and how a color of the face is reproduced is adjusted, it is effective to set a target color for each subject. For example, if the subject is a high-school girl, the girl tends to be tanned. Therefore, by setting the target color for the tanned skin, the corrected image data sets S1 enabling appropriate skin-color reproduction can be obtained. The subject ID can include information on gender, relationship (immediate family members only, etc.), age, marriage, blood type, hometown, academic background, income, and assets, for example.

The use ID represents what purpose the image data sets S0 will be used for. For example, uses such as memorial to a wedding ceremony, a New Year's party, a skiing event, or a trip to the beach, or uses of marine photographs or astronomical photographs are coded as the use ID and added to the image data sets Ss to be used for calculation of the correction functions f therefor. In this manner, the corrected image data sets S1 having been subjected to the optimal image processing appropriate for the use can be obtained.

The GPS information is obtained by using a GPS function built-in to a digital camera or the like used for obtaining the image data sets S0. The GPS information representing the time and a location of generation is added to each of the image data sets S0 by the GPS function. By adding the GPS information to the image data sets S0 in the above manner, the image data sets Ss can also have the GPS information added thereto. Therefore, the correction functions f appropriate for the GPS information can be found by using the image data sets S0 added with the same GPS information. In the case where the image data sets S0 have been obtained in almost the same location and at the same time, conditions of weather and lighting are almost the same. Therefore, by using the GPS information, the optimal image processing appropriate for the time and location can be carried out on the image data sets S0.

According to an experiment carried out by the applicant, the correction functions f calculated for the image data sets S0 obtained in an area at around noon were able to generate the correction parameters P enabling contrast enhancement such as high contrast and reduction in color temperature. The corrected image data sets S1 generated by the correction on the image data sets S0 using the correction parameters P were able to reproduce the images in a more preferable manner than in the case of correcting the image data sets S0 with the correction parameters P1 found for all the storage image data sets Ss. Later, the weather in the area at that time was found to be cloudy. Furthermore, the correction functions f calculated for the image data sets S0 obtained by photographing around 8 PM in a place generated the correction parameters P that are more peculiar than the correction parameters P1. However, the parameters P enabled preferable reproduction of the images. Later the facts that a concert was held in the place and a special lighting was used therefor were found.

The appreciation data correction apparatus of the present invention is installed in a photographic laboratory or in an agency for storing images as digital image data sets (such as an agency running a photograph portal site or a site for image manipulation), for example. The corrected image data sets S1 obtained by the image processing on the image data sets S0 are converted into an sRGB color space that is a standardized color space for monitors. The corrected image data sets after the conversion are then reproduced on an sRGB-standard monitor, or by a monitor or a printer having been subjected to color management. The monitor or the printer having been subjected to color management refers to a monitor or a printer managed by a color conversion profile representing a relationship between the corrected image data sets S1 and color data not dependent on the imaging device (such as CIE_XYZ or CIELab). The corrected image data sets S1 are converted by the color conversion profile and reproduced on the output device 2 as images whose colors are matched with sRGB reproduction colors. The color management is carried out accurately by the agency.

However, the agency may find it difficult in some cases to carry out the color management with the color conversion profile because of an operator lacking knowledge of the color management. Furthermore, the images are generally reproduced by the users with the output device of various models, such as a monitor, a printer, a digital TV set, a game terminal, an electronic photo frame, a PDA, an in-vehicle terminal, an outdoor large-screen display, a head mount display, or a retinal projection display, for example. For this reason, even if the agency carries out the appropriate correction, the output device of some of the users may not necessarily reproduce the images that have been corrected appropriately by the agency.

Figure 8:
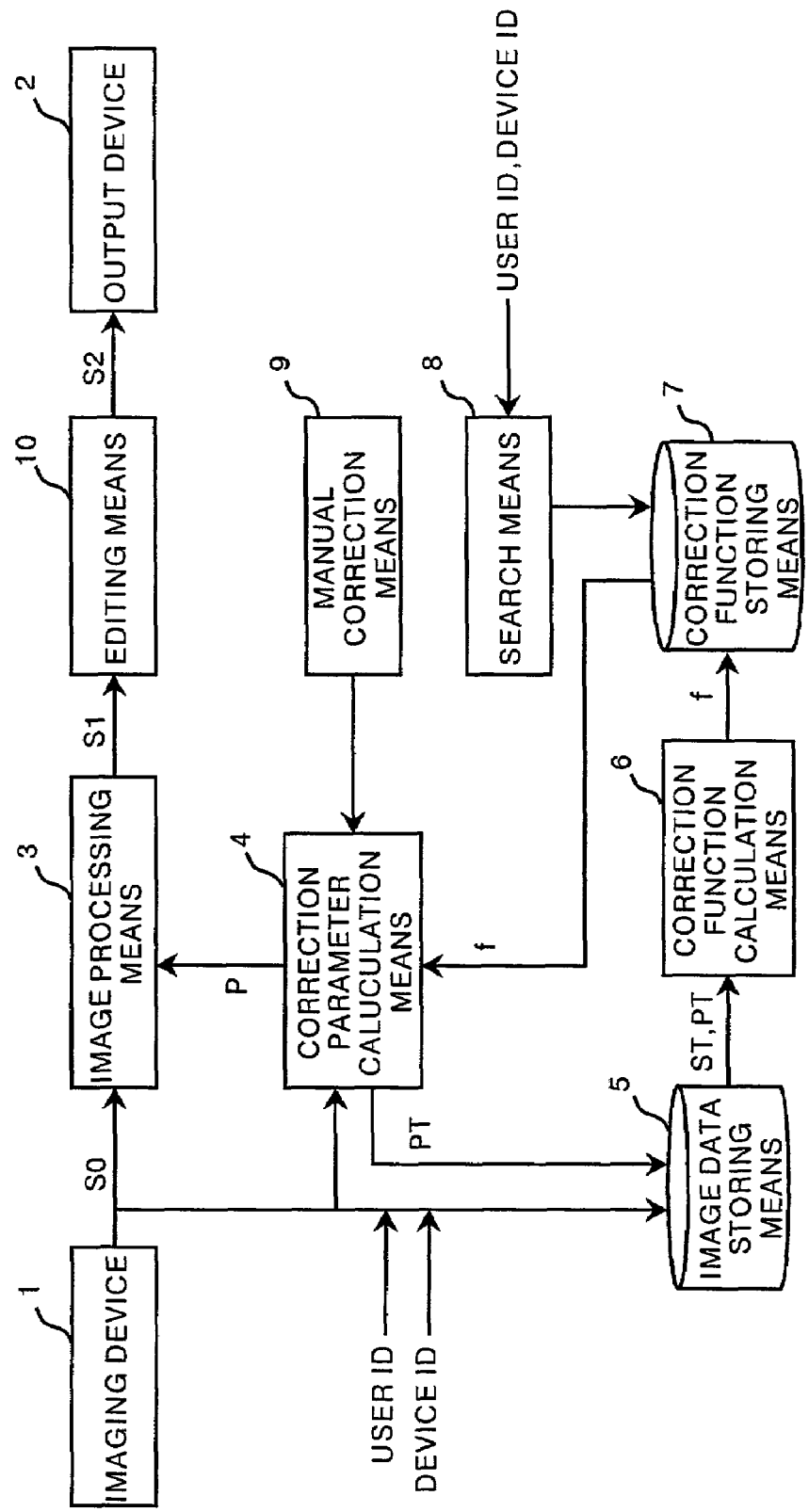
FIG. 8 is a block diagram showing a configuration of an image output system adopting an image data correction apparatus of a fourth embodiment of the present invention.

Therefore, the corrected image data sets S1 are preferably edited depending on each model of the output device to generate edited image data sets S2. Hereinafter, this method will be explained as a fourth embodiment of the present invention. FIG. 8 is a block diagram showing a configuration of an image output system adopting an appreciation data correction apparatus of the fourth embodiment of the present invention. As shown in FIG. 8, the image output system in the fourth embodiment comprises editing means 10 (correction means) for obtaining edited image data sets S2 by editing corrected image data sets S1.

Figure 9:
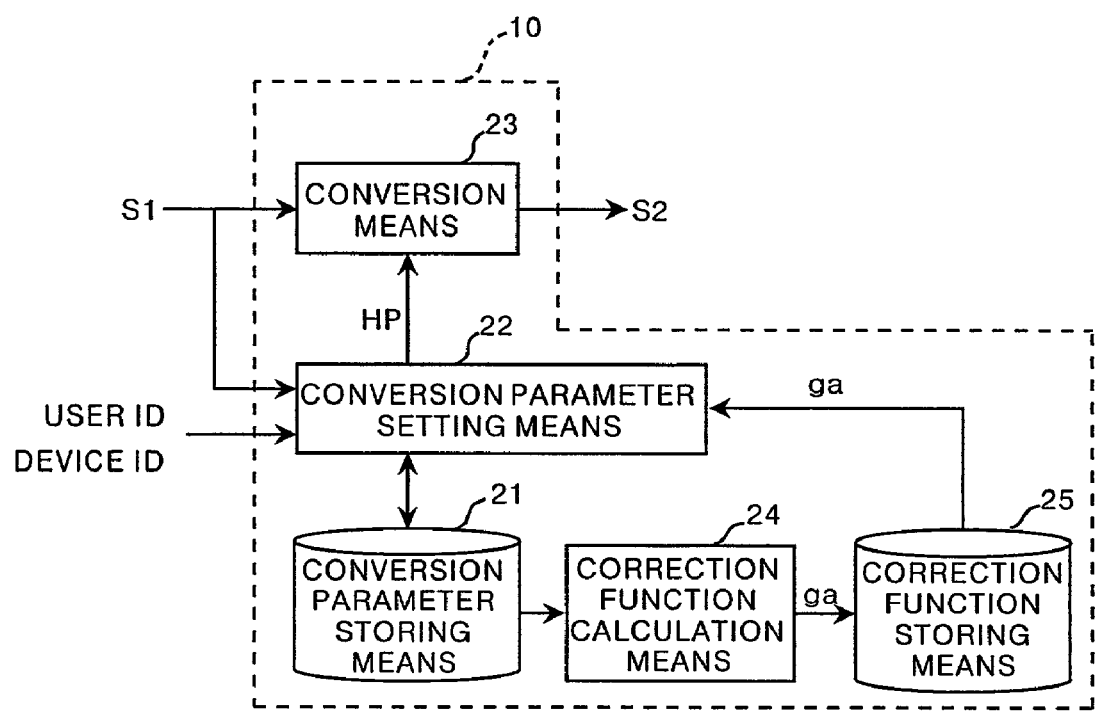
FIG. 9 is a block diagram showing a configuration of editing means.
Figure 10:
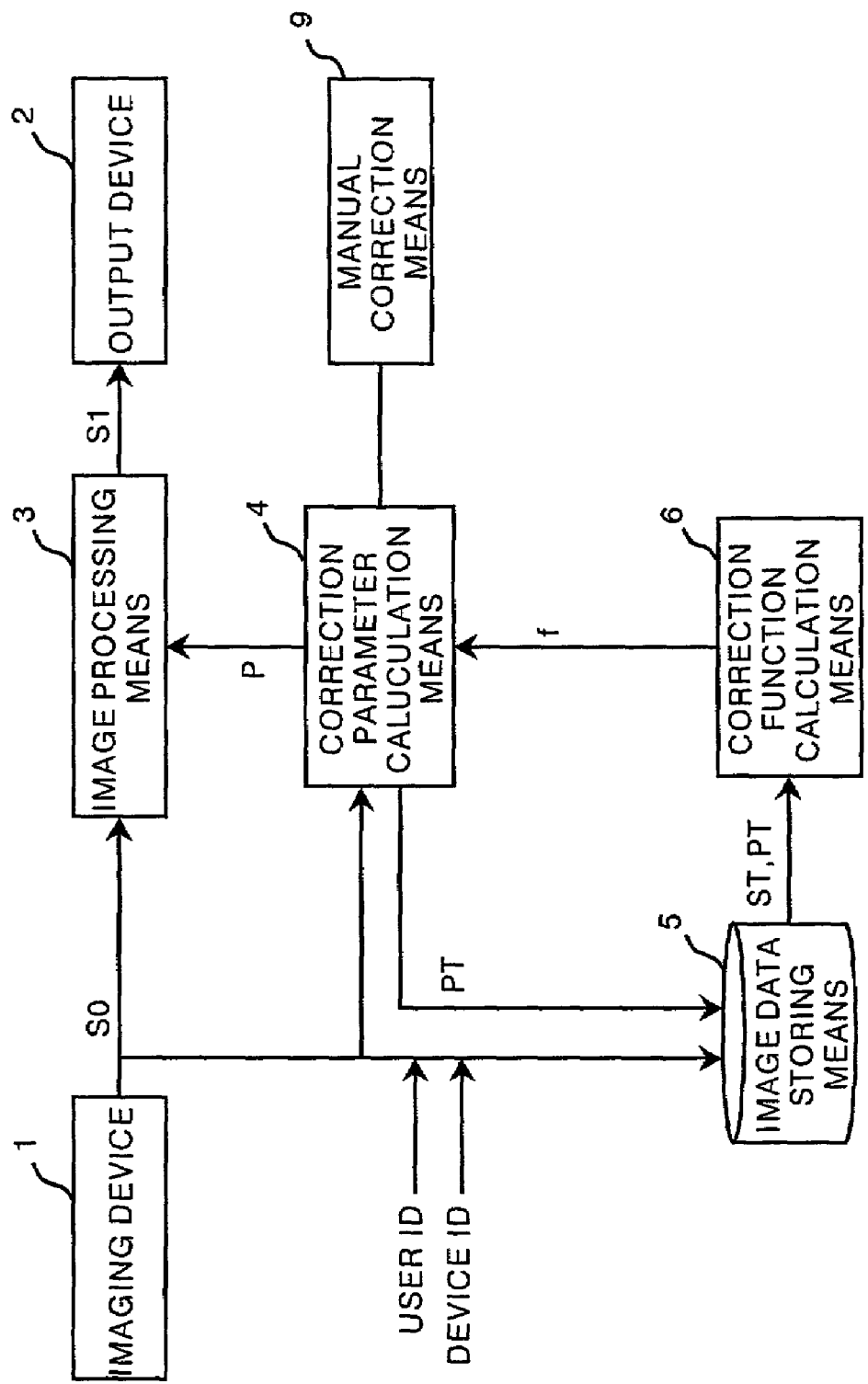
FIG. 10 is a block diagram showing a configuration of an image output system adopting an image data correction apparatus of a fifth embodiment of the present invention.

FIG. 9 is a block diagram showing a configuration of the editing means 10. As shown in FIG. 10, the editing means 10 comprises conversion parameter storing means 21 for storing conversion parameters HP for editing the corrected image data sets S1 depending on an output device 2, conversion parameter setting means 22 for setting the conversion parameters HP for converting the corrected image data sets S1, conversion means 23 for obtaining the edited image data sets S2 by converting the corrected image data sets S1 based on the conversion parameters HP that have been set, correction function calculation means 24 for calculating a correction function ga as will be explained later, and correction function storing means 25 for storing the correction function ga.

The conversion of the image data sets S1 is carried out as in the above embodiments by using the correction parameters HP. At least one of a tone conversion by using a one-dimensional look-up table, a color conversion by using a determinant, a color conversion by using a three-dimensional look-up table, a mask operation for sharpness enhancement or blurring, enlargement/reduction processing, a space frequency conversion, a multi-resolution conversion, an error diffusion, an affine transformation, and distortion/deformation correction is carried out. In order to determine the correction parameters HP for the output device 2, an image data set (hereinafter referred to as a standard image data set SN) corrected in advance according to a standard color space is used. Based on the conversion parameters HP for the plurality of conversions described above, the standard image data set SN is converted, and converted standard image data sets SNT are obtained. The converted standard image data sets SNT are provided to a user and the user displays the corrected standard image data sets SNT on the output device 2 of his/her own. The user then selects one of the converted standard image data sets SNT enabling desired image reproduction. Information on the selection is input to the editing means 10, and the correction parameters HP used for generating the corrected standard image data set SNT that has been selected are stored in the conversion parameter storing means 21, together with a user ID and/or a device ID and a characteristic parameter group comprising characteristic parameters (such as x, y, z, p, q, r in the above embodiment) for images represented by the image data sets S1. By repeating this procedure, the correction parameters HP and the characteristic parameter groups classified for respective users and/or various models of the output device are stored in the conversion parameter storing means 21.

The correction function calculation means 24 defines a primitive function g of high-degree polynomial that determines a relationship between the conversion parameters HP and each of the characteristic parameter groups as in Equation (8) below. The correction function ga representing the relationship between the conversion parameters HP and the characteristic parameter group for the user ID and/or device ID is then found as in the case of finding the correction functions fa, fb, and fc:

$$HP = g(x,y,z,p,q,r) \quad (8)$$

The correction function ga is stored in the correction function storing means 25.

In the case where the corrected image data sets S1 are edited, the conversion parameter setting means 22 calculates the characteristic parameter group for the corrected image data sets S1, and the correction function ga corresponding to the user ID or the output device ID is read from the correction function storing means 25. The conversion parameters HP are calculated by using the characteristic parameter group and the correction function ga. The calculated conversion parameters HP are input to the conversion means 23, and the corrected image data sets S1 are therein edited based on the conversion parameters HP. In this manner, the edited image data sets S2 are obtained. Therefore, regardless of the model of the output device 2, the edited image data sets S2 enabling reproduction of optimal images by the output device can be obtained.

In the above embodiment, the image processing is carried out on the image data sets for optimal quality, depending on the user or the imaging device. However, the present invention is not limited to the above embodiments. The present invention is applicable to the case of obtaining optimal sounds or moving-images by using digital contents such as audio data and moving-image data. For example, in the case of audio data, frequency filtering processing, and gain modulation processing or frequency conversion processing for each frequency band are carried out in some cases. The present invention is also applied to the case of carrying out the processing of these kinds.

In the above embodiments, the correction functions f calculated by the correction function calculation means 6 are stored in the correction function storing means 7 and the correction functions f are searched for at the time of image processing. However, in a fifth embodiment of the present invention shown in FIG. 10, correction parameters P may be calculated without using the correction function storing means 7. In other words, when image processing is carried out on target image data sets S0, storage image data sets Ss added with a specific user ID and/or a device ID and correction parameters PT added thereto may be read in real time from image data storing means 5. The correction functions are then calculated by correction function calculation means 6 and input to correction parameter calculation means 4 to generate the correction parameters P.

What is claimed is:

1. An appreciation data correction method comprising the steps of:

storing a plurality of appreciation data sets in a data storing means, classification information and correction parameters calculated in advance for carrying out aesthetic processing on the appreciation data set being attached to each appreciation data set;

selecting a target appreciation data set with specific classification information from the appreciation data sets in the data storing means;

extracting specific appreciation data sets, to which the same classification information as that of the target appreciation data set is attached, from the data storing means;

calculating an optimal correction parameter used for carrying out aesthetic processing on the target appreciation data set, based on the correction parameters for the extracted appreciation data sets; and obtaining a corrected appreciation data set by carrying out the aesthetic processing on the target appreciation data set, based on the calculated optimal correction parameter.

2. An appreciation data correction method as defined in claim 1, wherein the predetermined classification information includes information for specifying a user who obtained the appreciation data sets and/or information for specifying a device by which the appreciation data sets were obtained.

3. An appreciation data correction method as defined in claim 1 or 2, further comprising the steps of:

calculating a correction function for calculating the optimal correction parameter, based on the specific correction parameters and the specific appreciation data sets; and calculating the optimal correction parameter based on the correction function.

4. An appreciation data correction method as defined in claim 3, wherein the specific appreciation data sets are the specific appreciation data sets whose data sizes have been respectively reduced.

5. An appreciation data correction method as defined in claim 1 or 2, further comprising the steps of:

calculating a correction function for calculating the optimal correction parameter, based on correction function calculation appreciation data sets selected from the specific appreciation data sets according to predetermined priority and a corresponding portion of the specific correction parameters for the correction function calculation appreciation data sets that have been selected; and calculating the optimal correction parameter based on the correction function.

6. An appreciation data correction method as defined in claim 1 or 2, further comprising the steps of:

calculating in advance correction functions for calculating the optimal correction parameter for respective pieces of the specific classification information, based on the specific appreciation data sets and the specific correction parameters;

selecting a corresponding one of the correction functions in accordance with the specific classification information added to the target appreciation data set, based on the specific classification information added to the target appreciation data set; and calculating the optimal correction parameter, based on the correction function that has been selected.

7. An appreciation data correction method as defined in claim 6, wherein the specific appreciation data sets are the specific appreciation data sets whose data sizes have been respectively reduced.

8. An appreciation data correction method as defined in claim 6, further comprising the step of regularly updating the correction functions.

9. An appreciation data correction method as defined in claim 1 or 2, further comprising the steps of:
  calculating in advance correction functions for calculating the optimal correction parameter for respective pieces of the specific classification information, based on correction function calculation appreciation data sets selected from the specific appreciation data sets according to predetermined priority and a corresponding portion of the specific correction parameters for the correction function calculation appreciation data sets that have been selected;
  selecting a corresponding one of the correction functions in accordance with the specific classification information added to the target appreciation data set, based on the specific classification information added to the target appreciation data set; and
  calculating the optimal correction parameter, based on the correction function that has been selected.

10. An appreciation data correction method as defined in claim 1, further comprising the steps of:
  calculating a general correction parameter for general aesthetic processing based on the correction parameters; and
  carrying out the aesthetic processing on the target appreciation data set, based on the general correction parameter in addition to the optimal correction parameter.

11. An appreciation data correction method as defined in claim 1, further comprising the step of correcting the corrected appreciation data set, in accordance with a characteristic of an output device that outputs the corrected appreciation data set.

12. An appreciation data correction apparatus comprising:
  data storing means for storing a plurality of appreciation data sets, classification information and correction parameters calculated in advance for carrying out aesthetic processing on the appreciation data set being attached to each appreciation data set;
  target selection means for selecting a target appreciation data set with specific classification information from the appreciation data sets in the data storing means;
  extraction means for extracting specific appreciation data sets, to which the same classification information as that of the target appreciation data set is attached, from the data storing means;
  correction parameter calculation means for calculating an optimal correction parameter used for carrying out aesthetic processing on the target appreciation data set, based on the correction parameters for the extracted appreciation data sets; and
  aesthetic processing means for obtaining a corrected appreciation data set by carrying out the aesthetic processing on the target appreciation data set, based on the calculated optimal correction parameter.

13. An appreciation data correction apparatus as defined in claim 12, wherein the predetermined classification information includes information specifying a user who obtained the appreciation data sets and/or information specifying a device by which the appreciation data sets were obtained.

14. An appreciation data correction apparatus as defined in claim 12 or 13, further comprising:
  correction function calculation means for calculating a correction function used for calculating the optimal correction parameter, based on the specific appreciation data sets and the specific correction parameters, wherein
  the correction parameter calculation means calculates the optimal correction parameter, based on the correction function.

15. An appreciation data correction apparatus as defined in claim 14, wherein the specific appreciation data sets are the specific appreciation data sets whose data sizes have been respectively reduced.

16. An appreciation data correction apparatus as defined in claim 12 or 13, further comprising:
  correction function calculation means for calculating a correction function used for calculating the optimal correction parameter, based on correction function calculation appreciation data sets selected from the specific appreciation data sets according to predetermined priority and a corresponding portion of the specific correction parameters for the correction function calculation appreciation data sets that have been selected, wherein
  the correction parameter calculation means calculates the optimal correction parameter, based on the correction function.

17. An appreciation data correction apparatus as defined in claim 12 or 13, further comprising:
  correction function calculation means for calculating in advance correction functions used for calculating the optimal correction parameter for respective pieces of the specific classification information, based on the specific appreciation data sets and the specific correction parameters;
  correction function storing means for storing the correction functions that have been calculated; and
  function selection means for selecting a corresponding one of the correction functions in accordance with the specific classification information added to the target appreciation data set, based on the specific classification information added to the target appreciation data set, wherein
  the correction parameter calculation means calculates the optimal correction parameter, based on the correction function that has been selected.

18. An appreciation data correction apparatus as defined in claim 17, wherein the specific appreciation data sets are the specific appreciation data sets whose data sizes have been respectively reduced.

19. An appreciation data correction apparatus as defined claim 17, further comprising updating means for regularly updating the correction functions.

20. An appreciation data correction apparatus as defined in claim 12 or 13, further comprising:
  correction function calculation means for calculating in advance correction functions used for calculating the optimal correction parameter for respective pieces of the specific classification information, based on correction function calculation appreciation data sets selected from the specific appreciation data sets according to predetermined priority and a corresponding portion of the specific correction parameters for the selected specific appreciation data sets that have been selected;
  correction function storing means for storing the correction functions that have been calculated; and
  function selection means for selecting a corresponding one of the correction functions in accordance with the specific classification information added to the target appreciation data set, based on the specific classification information added to the target appreciation data set, wherein the correction parameter calculation means calculates the optimal correction parameter, based on the correction function that has been selected.

21. An appreciation data correction apparatus as defined in claim 12, the correction parameter calculation means calculating a general correction parameter used for general aesthetic processing, based on the correction parameters, and the aesthetic processing means carrying out the aesthetic processing on the target appreciation data set, based on the general correction parameter in addition to the optimal correction parameter.

22. An appreciation data correction apparatus as defined in claim 12, further comprising correction means for correcting the corrected appreciation data set, in accordance with a characteristic of an output device that outputs the corrected appreciation data set.

23. A computer-readable recording medium storing a program that causes a computer to execute an appreciation data correction method, the program comprising the procedures of:
   storing a plurality of appreciation data sets in data storing means, classification information and correction parameters calculated in advance for carrying out aesthetic processing on the appreciation data set being attached to each appreciation data set;
   selecting a target appreciation data set with specific classification information from the appreciation data sets in the data storing means;
   extracting specific appreciation data sets, to which the same classification information as that of the target appreciation data set is attached, from the data storing means;
   calculating an optimal correction parameter used for carrying out aesthetic processing on the target appreciation data set, based on the correction parameters for the extracted appreciation data sets; and
   obtaining a corrected appreciation data set by carrying out the aesthetic processing on the target appreciation data set, based on the calculated optimal correction parameter.

24. A computer-readable recording medium as defined in claim 23, the program further comprising the procedure of:
   calculating a correction function for calculating the optimal correction parameter, based on the specific correction parameters and the specific appreciation data sets, and
   the procedure of calculating the optimal correction parameter being the procedure of calculating the optimal correction parameter based on the correction function.

25. A computer-readable recording medium as defined in claim 23, the program further comprising the procedure of:
   calculating a correction function for calculating the optimal correction parameter, based on correction function calculation appreciation data sets selected from the specific appreciation data sets according to predetermined priority and a corresponding portion of the specific correction parameters for the correction function calculation appreciation data sets, and
   the procedure of calculating the optimal correction parameter being the procedure of calculating the optimal correction parameter based on the correction function.

26. A computer-readable recording medium as defined in claim 23, the further comprising the procedures of:
   calculating in advance correction functions for calculating the optimal correction parameter for respective pieces of the specific classification information, based on the specific appreciation data sets and the specific correction parameters; and
   selecting a corresponding one of the correction functions in accordance with the specific classification information added to the target appreciation data set, based on the specific classification information added to the target appreciation data set, wherein
   the procedure of calculating the optimal correction parameter is the procedure of calculating the optimal correction parameter based on the correction function that has been selected.

27. A computer-readable recording medium as defined in claim 23, the program further comprising the procedures of:
   calculating in advance correction functions for calculating the optimal correction parameter for respective pieces of the specific classification information, based on correction function calculation appreciation data sets selected from the specific appreciation data sets according to predetermined priority and a corresponding portion of the specific correction parameters for the correction function calculation appreciation data sets; and
   selecting a corresponding one of the correction functions in accordance with the specific classification information added to the target appreciation data set, based on the specific classification information added to the target appreciation data set, wherein
   the procedure of calculating the optimal correction parameter is the procedure of calculating the optimal correction parameter based on the correction function that has been selected.

28. A computer-readable recording medium as defined in claim 26 or 27, the program further comprising the procedure of regularly updating the correction functions.

29. A computer-readable recording medium as defined in claim 23, the program further comprising the procedure of:
   calculating a general correction parameter for general aesthetic processing, based on the correction parameters, and
   the procedure of obtaining the corrected appreciation data set being the procedure of obtaining the corrected appreciation data set by carrying out the aesthetic processing on the target appreciation data set, based on the general correction parameter in addition to the optimal correction parameter.

30. A computer-readable recording medium as defined in claim 23, the program further comprising the procedure of correcting the corrected appreciation data set, in accordance with a characteristic of an output device that outputs the corrected appreciation data set.

* * * * *